UNITED STATES PATENT OFFICE 2,659,755

GUANIDINE SALTS OF PENTACHLOROPHENOL

Marion W. Harman, Nitro, W. Va., assignor to Monsanto Chemical Company, St. Louis, Mo., a corporation of Delaware No Drawing. Application May 16, 1952, Serial No. 288,341

1 Claim. (Cl. 260—565)

The present invention relates to a new class of compounds and more particularly to guanidine salts of pentachlorophenol.

It has been found that guanidines, whether substituted by organic substituents or not, combine readily with pentachlorophenol to produce salts having unusual properties for destroying certain types of marine pests. The new salts are illustrated by the general formula

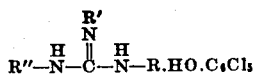

where $C_6Cl_5$ is the pentachlorophenyl group and where R, R' and R'' represent hydrogen, aryl, alkyl, aralkyl or alicyclic groups and R may in addition by a guanyl group as for example phenylguanyl.

Examples of the new products which may be cited as illustrative are

Guanidine pentachlorophenate
1,3-diphenylguanidine pentachlorophenate
Monophenylguanidine pentachlorophenate
Sym. triphenylguanidine pentachlorophenate
Monotolylguanidine pentachlorophenate
1,3-di-o-tolylguanidine pentachlorophenate
n-Dodecylguanidine pentachlorophenate
1,3-di-2-octylguanidine pentachlorophenate
1,3-di-cyclohexylguanidine pentachlorophenate
1,3-dimethylguanidine pentachlorophenate
1,3-diethylguanidine pentachlorophenate
1,3-dibutylguanidine pentachlorophenate
1,3-dibenzylguanidine pentachlorophenate
1,3-di-phenetylguanidine pentachlorophenate
1,3-di-p-xenylguanidine pentachlorophenate
1,3-di-o-methoxyphenylguanidine pentachlorophenate
1-dodecyl -5- phenylbiguanide pentachlorophenate
1,5-diphenylbiguanide pentachlorophenate
1-dodecyl-5-ethylbiguanide pentachlorophenate
1-butyl-5-phenylbiguanide pentachlorophenate
o-Tolylbiguanide pentachlorophenate
o-Biphenylbiguanide pentachlorophenate
Monophenylbiguanide pentachlorophenate
o-Anisidylbiguanide pentachlorophenate Illustrative of the method of preparation are the following detailed examples.

Example 1

To a mixture of 26.6 parts by weight (substantially 0.1 molecular proportion) of 95% pentachlorophenol and 21.1 parts by weight (substantially 0.1 molecular proportion) of 1,3-diphenylguanidine was added 40 parts by weight of alcohol. A clear solution resulted and the exothermic reaction caused the temperature to rise to 40° C. The reaction mass was cooled to room temperature and the crystalline product removed by filtration and washed with alcohol. There was obtained 35 parts by weight of 1,3-diphenyl guanidine pentachlorophenate, M. P. 170-174° C.

Example 2

56 parts by weight (substantially 0.2 molecular proportion) of 95% pentachlorophenol was dissolved in 168 parts by weight of warm alcohol and to the solution so prepared 19.2 parts by weight (substantially 0.1 molecular proportion) of 94% guanidine carbonate was gradually added at such a rate that the evolution of carbon dioxide did not become too vigorous. After the evolution of carbon dioxide ceased, the reaction mass was heated to boiling for 15 minutes and the solution then filtered hot. The filtrate was concentrated and the crystalline solid which separated was removed. There was obtained 68.2 parts by weight of guanidine pentachlorophenate, a white crystalline material melting at 190-205° C. The product was very soluble in ether, acetone, alcohol, ethyl acetate and soluble in hot water but insoluble or very slightly soluble in heptane, benzene, chloroform and carbon tetrachloride.

Example 3

To a solution of 56 parts by weight (substantially 0.2 molecular proportion) of 95% pentachlorophenol in 158 parts by weight of alcohol was gradually added a solution of 40 parts by weight (substantially 0.2 molecular proportion) of o-tolylbiguanide in 79 parts by weight of alcohol. The solvent was then removed by evaporation on a steam bath. There was obtained 105.8 parts by weight of o-tolylbiguanide pentachlorophenate, a soft amber resin which hardened to a pearl grey solid, M. P. 159-161° C. It was very soluble in acetone, alcohol, ethyl acetate, soluble in ether but insoluble or very slightly soluble in water, heptane, chloroform and benzene.

Example 4

Hot solutions were mixed consisting of 56 parts by weight (substantially 0.2 molecular proportion) of 95% pentachlorophenol in 32 parts by weight of alcohol and 57.4 parts by weight (substantially 0.2 molecular proportion) of sym. triphenylguanidine in 316 parts by weight of alcohol. On stirring and cooling the resulting solution the product crystallized. The solids were separated from the cold mass by filtration and washed with a little alcohol and dried at 50° C. There was obtained 85 parts by weight of sym. triphenylguanidine pentachlorophenate, cream colored crystals, M. P. 174-176° C. It was very soluble in acetone, ethyl acetate, hot alcohol, hot chloroform and hot benzene but only slightly soluble in ether and insoluble or very slightly soluble in water and heptane.

*Example 5*

The hot solution of pentachlorophenol described in Example 4 was admixed with a hot solution of 47.8 parts by weight (substantially 0.2 molecular proportion) of 1,3-di-o-tolylguanidine in 158 parts by weight of alcohol. The solvent was removed by evaporation on a steam bath and the residue heated in an oven for 6 hours at 100° C. There was obtained 103.5 parts by weight of 1,3-di-o-tolylguanidine pentachlorophenate, M. P. 144-152° C. It was very soluble in ether, acetone, alcohol, ethyl acetate, chloroform and hot benzene but insoulble or very slightly soluble in water and heptane.

Although sodium pentachlorophenate is one of the standards employed for control of molluscacides, there is a need for more effective products. Conversion of the pentachlorophenate to the guanidine salt greatly augments the toxicity to mollusks. This activity is illustrated by tests carried out as follows: A filter paper is placed in the bottom of a disposable container; 2 cc. of a 1:20,000 dilution of the test material is added to the filter paper. Ten snails are placed in each dish and mortality readings are made at 1, 2, 6, 24, 48, 72 and 98 hours. On the fourth day the percent kill is determined. If the material is toxic, the degree of toxicity is determined by series dilutions. Thus, the MLD-50 indicates the dilution at which 50% of the snails are killed. Therefore, if a compound kills 50% of the snails at a dilution of 1:32,000, it can be surmised that it is four times as effective as one which has an MLD-50 of 1:8,000.

| Toxicant | MLD-50 |
|---|---|
| 1,3-Diphenylguanidine pentachlorophenate | 33,300 |
| Sodium pentachlorophenate | 8,000 |

It is intended to cover all changes and modifications of the examples of the invention herein chosen for purposes of disclosure which do not constitute departures from the spirit and scope of the invention.

What is claimed is:

1,3-di-o-tolylguanidine pentachlorophenate.

MARION W. HARMAN.

References Cited in the file of this patent

UNITED STATES PATENTS

| Number | Name | Date |
|---|---|---|
| 2,377,167 | Migrdichian | May 29, 1945 |
| 2,385,719 | Migrdichian | Sept. 25, 1945 |